United States Patent [19]

Strobel

[11] 4,416,082

[45] Nov. 22, 1983

[54] MARINE ANIMAL TRAP

[76] Inventor: Charles Strobel, 15 Parma Rd., Island Park, N.Y. 11558

[21] Appl. No.: 348,688

[22] Filed: Feb. 16, 1982

[51] Int. Cl.³ .............................................. A01K 69/10
[52] U.S. Cl. ......................................... 43/102; 43/105
[58] Field of Search .......................... 43/102, 105, 100

[56] References Cited

U.S. PATENT DOCUMENTS

| | | | |
|---|---|---|---|
| 1,188,185 | 6/1916 | Krulish | 43/105 |
| 1,531,299 | 3/1925 | Merle | 43/105 |
| 1,968,758 | 7/1934 | Gatch | 43/105 |
| 2,218,843 | 10/1940 | Fuller | 43/105 |
| 2,489,856 | 11/1949 | Buford | 43/102 |
| 2,530,449 | 11/1950 | Bush | 43/102 |
| 3,867,782 | 2/1975 | Ortiz | 43/105 |
| 4,044,493 | 8/1977 | Fox | 43/105 |
| 4,134,226 | 1/1979 | Petrella | 43/102 |
| 4,221,071 | 9/1980 | Sjolund | 43/102 |

*Primary Examiner*—Gene Crosby
*Attorney, Agent, or Firm*—Wells & Wells

[57] ABSTRACT

A baited marine animal trap for lowering into the water where the doors open to entice marine animals and the marine animals are trapped by elevating the trap and closing the doors. The present trap has the openings on the sides reduced to decrease the probability of the escape of the trapped marine animals.

7 Claims, 7 Drawing Figures

MARINE ANIMAL TRAP

BACKGROUND OF THE INVENTION

The field of the invention is fishing, trapping and vermin destroying using an elevatable cage and the invention is particularly concerned with a trap for marine animals.

The state of the art of such elevatable marine animal traps may be ascertained by reference to U.S. Pat. Nos. 2,489,856 and 4,134,226, the disclosures of which are incorporated herein.

It is known to trap fish using a baited cage with funnel shaped entry ways where a fish enters the larger diameter of the funnel entrance and then passes through the smaller entrance into the cage and is then trapped inside.

U.S. Pat. No. 4,134,226 shows the latest development in crab traps where a square, metal, wire cage is dropped into the water to rest on the bottom with one or more sides open. Crabs crawl into the baited trap and the trap is sprung as it is pulled to the surface.

According to the prior art crab traps such as disclosed in U.S. Pat. Nos. 2,489,856 and 4,134,226 it is not known to use these traps for both crabs and fish.

SUMMARY OF THE INVENTION

Having in mind the limitations of the prior art it is an object of the present invention to provide a marine animal trap which is suitable for catching both fish and crabs.

Another object of the present invention is to combine the concepts of the funnel shaped fish trap entry with the four door crab trap.

These objects are accomplished in the present invention by a marine animal trap which has:

(a) a cubical metal rod frame;

(b) a wire mesh or other covering extending over the base of the frame;

(c) a wire mesh extending over the top of the frame;

(d) four wire mesh doors, each hinged to one of the four edges of the base of the frame;

(e) wire mesh converging extensions of the sides and top edges of the frame having edges defining closures with the wire mesh doors;

(f) Two rods extending vertically from the base to the top of the frame adapted to control the vertical movement of bait wires; and (g) cords extending from each of the doors and from the bait wires to an opening in the wire mesh on the top of the frame so that the doors can be closed and bait lifted vertically during elevation of the trap.

BRIEF DESCRIPTION OF THE DRAWING

The invention may best be described by reference to the appended drawings, wherein.

DESCRIPTION OF THE PREFERRED EMBODIMENTS

Figure 1:
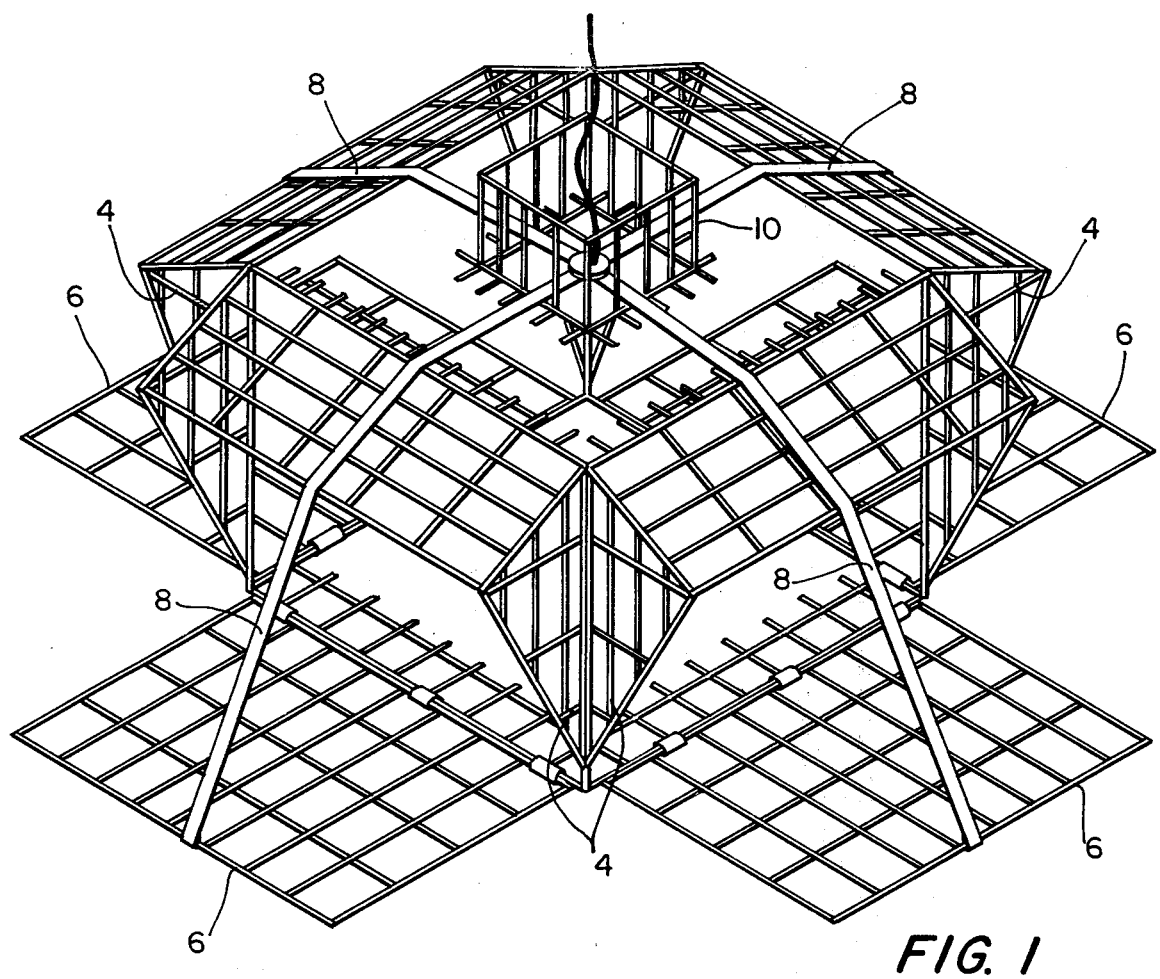
FIG. 1 is a perspective diagrammatic view of the marine animal trap of the present invention.

With particular reference to FIG. 1, the marine animal trap is shown having a metal frame 1 comprising 12 rods secured by welding at the ends, these rods defining the edges of a cube. Mesh edges 2 extend outward and downward from the upper edges of the cubical frame. Triangular mesh filets 4 extend outward and inward to join with the sides of edges 2 and define openings of reduced size in the four sides of the cubical frame 11.

Mesh doors 6 are hinged on the bottom edges of the cubical frame 1. Hinges or connectors A, B are used to secure the mesh doors and edges to the frame. The edges and doors may be constructed of wire such as steel or other non-corrosive metal or of synthetic fiber plastics such as nylon or polypropylene.

Doors 6 are elevated to closed positions by cords 8 which pass through hole 10 in the mesh covered top of the cubical frame 1.

Figure 2:
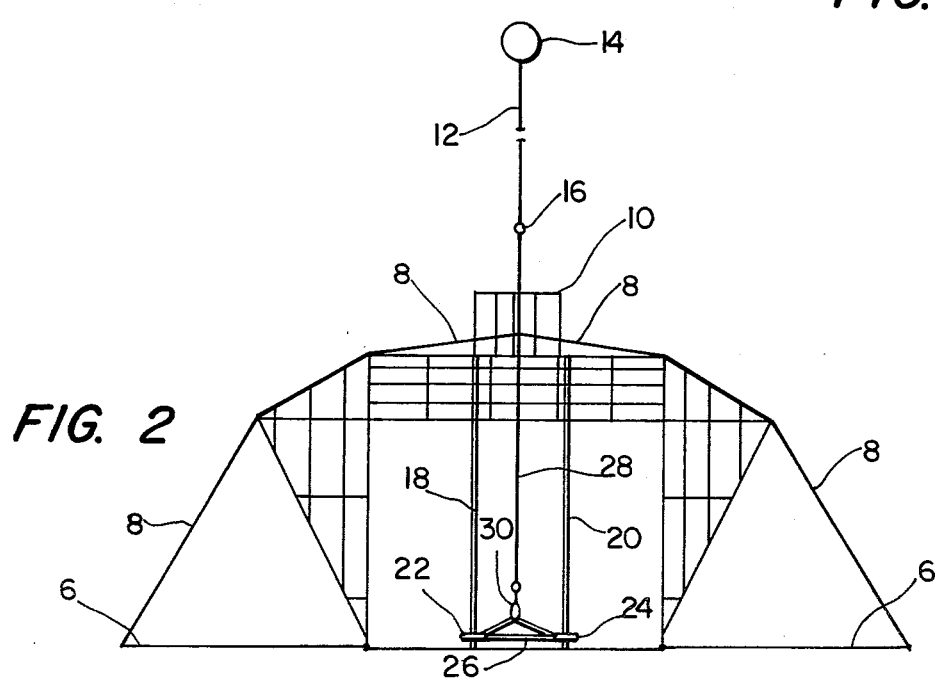
FIG. 2 is a side, diagrammatic, elevational view of FIG. 1.

In FIG. 2 the fishing line 12 is shown having a bell or other alarm 14 at the top, a possible bobber or float 16 at water level and connected at the bottom end with the ends of cords 6. Doors 6 are shown open where open is horizontal or on the bottom and close in the elevated position. The bait mechanism is also shown in FIG. 2 as supported by vertical rods 18,20 extending from the base on the frame 1 to the mesh top on the frame. Rings 22,24 supported on the vertical rods have bait wires 26 threaded therethrough. Line 28 connects the end of fishing line 12 with a swivel 30 and this swivel 30 is connected to the bait wires 26.

Figure 3:
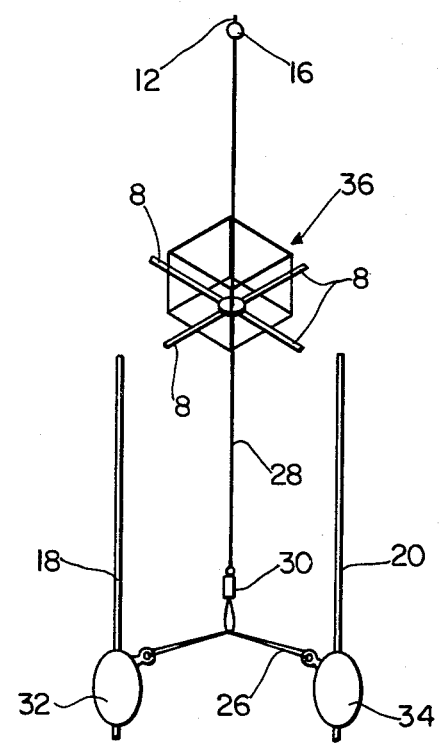
FIG. 3 is a side, diagrammatic, elevational view of an embodiment of the bait mechanism of the present invention.

FIG. 3 shows a particular embodiment of the bait mechanism where the rings 22, 24 are replaced by modified lead sinkers 32, 34. These slides 32, 34 are formed from lead sinkers by removing the heads, drilling a longitudinal hole therethrough and welding or soldering the severed necks off-center to the shoulders of the sinkers.

Further in FIG. 3 the cords 8, 12, 28 are shown converging in box 36 secured to the top of the trap.

Figure 4:
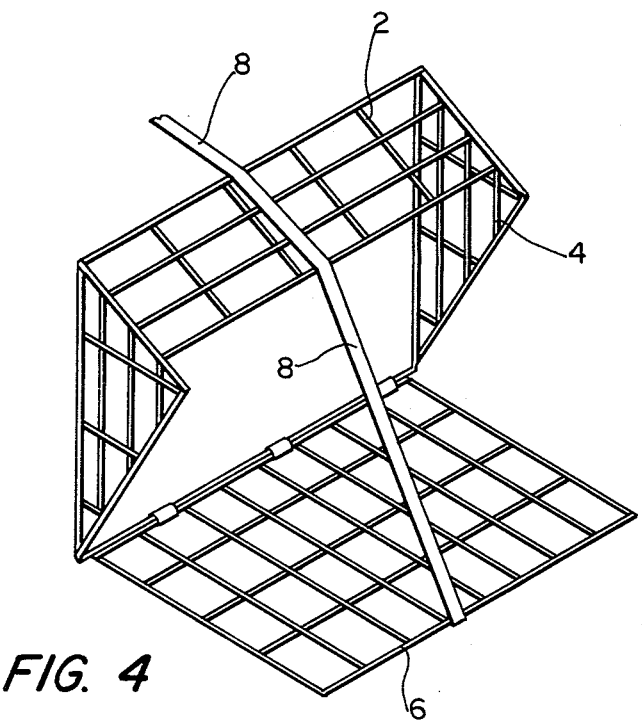
FIG. 4 is a detailed showing of one of the trap doors of the present invention.

FIG. 4 shows a door 6 with a cord 8 secured to the edge thereof and extending through the mesh of edge 2.

Figure 5:
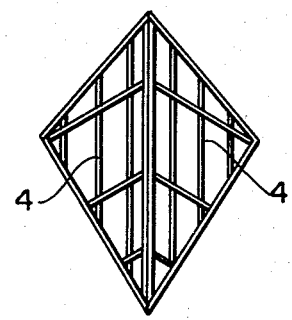
FIG. 5 is a detailed showing of one of the corners between the sides of the doors of the present invention.

A detailed showing of two filets 4 at the vertical edge of the frame 1 is shown in FIG. 5.

Figure 6:
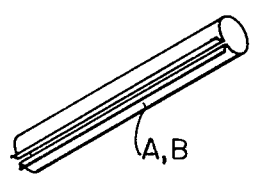
FIGS. 6 and 7 are detailed showings of clamps or hinges for securing parts of the trap to the frame.
Figure 7:
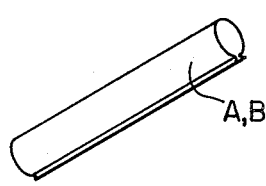

FIGS. 6 and 7 show in detail the metal clamps A, B for securing and/or hanging edges 2 and doors 6 to frame 1.

BEST MODE OF CARRYING OUT THE INVENTION

The trap shown in FIG. 2 is baited on a dock, in a boat on a sea wall, etc. by connecting bait to wires 26. Line 12 is then pulled up, the doors 6 close and the bait is raised to the top of the trap by line 28 and rings 22, 24.

With the doors closed and the bait at the top of the trap, the trap is lowered into the water until the tray hits the bottom. As line 12 is relaxed, the doors 6 open and the bait moves to the bottom or to any position between the top and bottom of the trap as adjusted by the length of cord 28.

Bobber 16 is adjusted at the surface for a visual observation of a strike and the end of line 12 can be attached to an alarm or bell so that one fisherman can work with a number of traps simultaneously.

When a marine animal (fish or crab) strikes the bait on line 26, a signal is given, the fisherman pulls on line 12 and the doors are closed to trap the marine animal.

In the case of fast swimming marine animals, when alarmed by movement of the trap they try to escape but the mesh edges 2 and mesh filets 4 deter their escape. Obviously the edges 2 and filets 4 could be extended so that the size of the doors 6 will be reduced. This size of the doors 16 is optimized in the present invention so that the opening is large enough for the marine animal to enter and at the same time the edges 2 and filets 4 are large enough to deter his escape.

I claim:

1. A marine animal trap, consisting:
   (a) a rectangular rod frame having edges defining a top, a base and four sides;
   (b) a covering extending over the base of the frame;
   (c) a wire mesh extending over the top of the frame;
   (d) four wire mesh doors, each hinged to one of the four edges of the base of the frame;
   (e) wire mesh outwardly converging extensions of the sides and top edges of the frame having edges defining closures with the wire mesh doors;
   (f) means for baiting the trap; and
   (g) cords extending from each of the doors and from the means for baiting to the top of the frame whereby the doors can be closed and the means for baiting lifted vertically during elevation of the trap.

2. The trap of claim 1, wherein said means for baiting comprises two vertical rods extending from the base to the top, sliders on said rods and a baiting wire threaded through the sliders and operatively connected to a common fishing line with said cords.

3. The trap of claim 2, wherein said wire mesh is steel.

4. The trap of claim 2, wherein said wire mesh is plastic.

5. The trap of claim 1, further comprising a fishing line attached to said cords and having an alarm attached thereto.

6. The trap of claim 5, wherein said alarm is a bobber.

7. The trap of claim 5, wherein said alarm is a bell.

* * * * *